US011856299B2

(12) United States Patent
Scheich

(10) Patent No.: US 11,856,299 B2
(45) Date of Patent: Dec. 26, 2023

(54) BOWL-SHAPED PHOTOGRAPHIC STAGE

(71) Applicant: Carvana, LLC, Tempe, AZ (US)

(72) Inventor: Davo Scheich, Troy, MI (US)

(73) Assignee: Carvana, LLC, Tempe, AZ (US)

( * ) Notice: Subject to any disclaimer, the term of this patent is extended or adjusted under 35 U.S.C. 154(b) by 0 days.

(21) Appl. No.: 17/883,462

(22) Filed: Aug. 8, 2022

(65) Prior Publication Data

US 2022/0373866 A1 Nov. 24, 2022

Related U.S. Application Data

(63) Continuation of application No. 16/210,304, filed on Dec. 5, 2018, now Pat. No. 11,412,135.

(51) Int. Cl.
| | | |
|---|---|---|
| G03B 15/06 | (2021.01) | |
| H04N 23/698 | (2023.01) | |
| G03B 15/07 | (2021.01) | |
| H04N 23/50 | (2023.01) | |
| H04N 23/56 | (2023.01) | |
| H04N 23/66 | (2023.01) | |
| H04N 23/90 | (2023.01) | |

(52) U.S. Cl.
CPC ........... *H04N 23/698* (2023.01); *G03B 15/06* (2013.01); *G03B 15/07* (2013.01); *H04N 23/50* (2023.01); *H04N 23/56* (2023.01); *H04N 23/66* (2023.01); *H04N 23/90* (2023.01)

(58) Field of Classification Search
CPC ............ H04N 5/23238; H04N 5/2251; H04N 5/2256; H04N 5/23203; H04N 5/247; G03B 15/07

USPC .......................................................... 348/37
See application file for complete search history.

(56) References Cited

U.S. PATENT DOCUMENTS

| | | |
|---|---|---|
| 4,918,321 A | 4/1990 | Klenk et al. |
| 5,636,024 A | 6/1997 | Crookham et al. |
| 5,726,705 A | 3/1998 | Imanishi et al. |
| 6,266,138 B1 | 1/2001 | Keshavmurthy |
| 6,320,654 B1 | 11/2001 | Alders et al. |
| 6,901,384 B2 | 5/2005 | Lynch et al. |

(Continued)

FOREIGN PATENT DOCUMENTS

WO  2005022252  3/2005

OTHER PUBLICATIONS

USPTO; Restriction Requirement dated Jun. 11, 2020 in U.S. Appl. No. 16/210,304.

(Continued)

*Primary Examiner* — Nguyen T Truong
(74) *Attorney, Agent, or Firm* — SNELL & WILMER L.L.P.

(57) ABSTRACT

A bowl-shaped photographic stage and photographic system is provided that produces consistent diffused lighting of an object or subject that is virtually shadow free for obtaining rotational views of the object in a time efficient manner. The bowl-shaped photographic stage may be used with a camera array, or a single camera may be moved around the circumference of the photographic stage to obtain a series of images needed to form a rotational view of an object or subject. Alternatively, the bowl-shaped photographic stage may be rotated to pass by a single fixed camera to obtain a series of images needed to form a rotational view of an object or subject.

20 Claims, 7 Drawing Sheets

(56) References Cited

U.S. PATENT DOCUMENTS

| | | | |
|---|---|---|---|
| 6,950,807 | B2 | 9/2005 | Brock |
| 8,041,409 | B2 | 10/2011 | Leevy et al. |
| 8,050,735 | B2 | 11/2011 | Feke et al. |
| 8,112,325 | B2 | 2/2012 | Foy et al. |
| 9,037,968 | B1 | 5/2015 | Pringle et al. |
| 9,046,740 | B1 | 6/2015 | Smithweck |
| 9,113,784 | B2 | 8/2015 | Feke et al. |
| 9,302,190 | B1 | 4/2016 | Jennings |
| 9,412,203 | B1 | 8/2016 | Garcia, III et al. |
| 9,429,817 | B1 | 8/2016 | Harder et al. |
| 10,311,636 | B1 | 6/2019 | Falstrup et al. |
| 2001/0020933 | A1 | 9/2001 | Maggioni |
| 2002/0082860 | A1 | 6/2002 | Johnson |
| 2002/0085219 | A1 | 7/2002 | Ramamoorthy |
| 2002/0105513 | A1 | 8/2002 | Chen |
| 2003/0107568 | A1 | 6/2003 | Urisaka et al. |
| 2004/0078298 | A1 | 4/2004 | Fusama |
| 2006/0114531 | A1 | 6/2006 | Webb et al. |
| 2006/0182308 | A1 | 8/2006 | Gerlach et al. |
| 2006/0185550 | A1 | 8/2006 | Zanzucchi et al. |
| 2006/0256959 | A1 | 11/2006 | Hymes |
| 2007/0011083 | A1 | 1/2007 | Bird et al. |
| 2007/0035539 | A1 | 2/2007 | Matsumura et al. |
| 2007/0057815 | A1 | 3/2007 | Foy et al. |
| 2007/0172216 | A1 | 7/2007 | Lai |
| 2007/0211240 | A1 | 9/2007 | Matsumoto et al. |
| 2007/0230824 | A1 | 10/2007 | Alvarez |
| 2008/0106593 | A1 | 5/2008 | Arfvidsson et al. |
| 2008/0187182 | A1 | 8/2008 | Abe |
| 2008/0250585 | A1 | 10/2008 | Auer et al. |
| 2009/0160930 | A1 | 6/2009 | Ruppert |
| 2010/0067801 | A1 | 3/2010 | Van Den Hengel et al. |
| 2010/0238290 | A1 | 9/2010 | Riley et al. |
| 2010/0306413 | A1 | 12/2010 | Kamay |
| 2011/0080487 | A1 | 4/2011 | Venkataraman et al. |
| 2011/0102744 | A1 | 5/2011 | Saad et al. |
| 2011/0221904 | A1 | 9/2011 | Swinford |
| 2013/0107041 | A1 | 5/2013 | Norem et al. |
| 2014/0009275 | A1 | 1/2014 | Bowers et al. |
| 2014/0192181 | A1 | 7/2014 | Taylor et al. |
| 2014/0235362 | A1 | 8/2014 | Fox et al. |
| 2015/0077564 | A1 | 3/2015 | Swindord |
| 2015/0111601 | A1 | 4/2015 | Fagan |
| 2015/0227296 | A1 | 8/2015 | Pringle et al. |
| 2016/0100087 | A1* | 4/2016 | Scheich ............. G06F 16/5862 348/47 |
| 2017/0264936 | A1 | 9/2017 | Depies |
| 2018/0160019 | A1 | 6/2018 | Scheich |
| 2018/0084224 | A1 | 11/2018 | McNelley et al. |
| 2019/0235737 | A1 | 8/2019 | Kuribayashi |
| 2019/0244336 | A1 | 8/2019 | Wakisaka et al. |
| 2019/0253701 | A1 | 8/2019 | Himel et al. |
| 2020/0173930 | A1* | 6/2020 | Alonie ................... G01N 21/87 |

OTHER PUBLICATIONS

USPTO; Non-Final Office Action dated Oct. 2, 2020 in U.S. Appl. No. 16/210,304.
USPTO; Final Office Action dated May 7, 2021 in U.S. Appl. No. 16/210,304.
USPTO; Advisory Action dated Aug. 17, 2021 in U.S. Appl. No. 16/210,304.
USPTO; Non-Final Office Action dated Oct. 5, 2021 in U.S. Appl. No. 16/210,304.
USPTO; Notice of Allowance dated Apr. 6, 2022 in U.S. Appl. No. 16/210,304.
USPTO; Notice of Allowance dated May 20, 2016 in U.S. Appl. No. 14/161,254.
USPTO; Restriction Requirement dated May 9, 2018 in U.S. Appl. No. 15/228,027.
USPTO; Non-Final Office Action dated Dec. 13, 2018 in U.S. Appl. No. 15/228,027.
USPTO; Notice of Allowance dated May 14, 2019 in U.S. Appl. No. 15/228,027.
USPTO; Non-Final Office Action dated Sep. 17, 2020 in U.S. Appl. No. 16/569,826.
USPTO; Final Office Action dated Mar. 12, 2021 in U.S. Appl. No. 16/569,826.
USPTO; Non-Final Office Action dated Aug. 4, 2021 in U.S. Appl. No. 16/569,826.
USPTO; Final Office Action dated Dec. 22, 2021 in U.S. Appl. No. 16/569,826.
USPTO; Non-Final Office Action dated Jul. 21, 2022 in U.S. Appl. No. 16/569,826.
ISA; International Search Report dated Apr. 5, 2018 in PCT/US2017/065057.
ISA; International Preliminary Report on Patentability dated Jun. 11, 2019 in PCT/US2017/065057.
USPTO; Non-Final Office Action dated Sep. 19, 2019 in U.S. Appl. No. 15/834,374.
USPTO; Final Office Action dated Jun. 12, 2020 in U.S. Appl. No. 15/834,374.
USPTO; Notice of Allowance dated Oct. 15, 2020 in U.S. Appl. No. 15/834,374.
EPO; Search Report and Opinion dated Jun. 2, 2020 in EP Application No. 17879202.4.
EPO; Examination Report dated May 10, 2021 in EP Application No. 17879202.4.
CNIPA; Office Action dated Dec. 31, 2020 in CN Application No. 201780085848.0.
CNIPA; Notice of Allowance dated Aug. 11, 2021 in CN Application No. 201780085848.0.
In Re Venner et al., No. 6391, LexisNexis; United States Court of Customs and Patent Appeals; Oral argument Nov. 7, 1958, Dec. 19, 1958.
Credit Acceptance Corp, Guaranteed Credit Approval, Auto Loan; http://www.insider-car-buying-tips.com/credit_acceptance_corp.html; accessed Dec. 17, 2013.
Auto Success; Credit Acceptance's Upgraded Credit Approval Processing System Simplifies Approval Process; vol. 1 Issue 33; http://www.imakenews.com/autosuccess/e_article001075242.cfm?x=bgB6V1j,b7jJcq29,w; accessed Dec. 17, 2013.
Credit Acceptance Corp (CACC.OQ) Company Profile I Reuters.com; http://www.reuters.com/finance/stocks/companyProfile?symbol=CACC.OQ; accessed Dec. 17, 2013.
Credit Acceptance Corporation—Annual Report; United States Securities and Exchange Commission; Washington D. C. 20549; Form 10-K; Annual Report Pursuant to Section 13 or 15(d) of the Securities Exchange Act of 1934. http://www.ir.creditacceptance.com/secfiling.cfm?filingID=885550-13-18&CIK=885550; accessed Dec. 17, 2013.

* cited by examiner (a)

(b)

(c)

(d)

(e)

(f)

(g)

(h)

(i)                    (j)

(k)                    (l)

(m)                    (n)

(o)                    (p)

(a) (b)

(c) (d)

(e) (f)

BOWL-SHAPED PHOTOGRAPHIC STAGE

CROSS-REFERENCE TO RELATED APPLICATIONS

This application is a continuation of, claims priority to and claims the benefit of, U.S. Ser. No. 16/210,304, filed Dec. 5, 2018, which is herein incorporated by reference in its entirety for all purposes.

FIELD OF THE INVENTION

The present invention generally relates to the field of photography, and more specifically to a new and useful photographic stage for multi-directional photographs of an object or subject.

BACKGROUND OF THE INVENTION

Internet based commerce has grown exponentially in recent years, and has increased the need for improved images of items that are being offered for sale. Unlike traditional store based transactions where a consumer may be able to see and touch an actual item for sale in three-dimensions, pictures of items for sale on the Internet are typically only two-dimensional static representations or photographs.

Software is available that allows a user to rotate objects up to 360 degrees on a screen to gain a three-dimensional perspective of an item. In order to produce images of an actual object to be rotated with these rotational software packages, multiple still pictures or frames of the object must be taken or generated from various angles, or the object must be repositioned multiple times in front of an image capture device or camera. Furthermore, proper illumination of the object to be photographed must be maintained at all angles. The object to be photographed should be uniformly lit from all directions without glare and with minimal shadowing.

A camera array is a formation of multiple cameras that are networked to a controller to capture an image simultaneously or in a synchronized order from each individual camera perspective or angle. When the images or captured frames are edited together many types of photographic and video effects may be obtained. For example, when the cameras in an array are triggered simultaneously and the captured frame images are edited together a moment in time appears frozen as a viewer is moved around the composite image. Alternative, the image may be rotated in three-dimensional space with the aforementioned software applications. In addition to the frozen moment additional special effects include stop-start, slow motion, time ramp, among other popular special effects.

A problem associated with camera array shots is obtaining consistent diffused lighting of an object that is virtually shadow free. Large photographic stages such as disclosed in U.S. patent application Ser. No. 15/834,374 filed on Dec. 7, 2017 entitled Vehicle Photographic Chamber provides for rotational viewing of a photographed vehicle with optimized lighting of the vehicle. However, such large photographic stages are not suited for smaller items.

Thus there exists a need for a photographic stage that provides consistent diffused lighting of an object that is virtually shadow free for obtaining rotational views of the object in a time efficient manner.

SUMMARY OF THE INVENTION

A number of embodiments can include a system. The system can comprise: a photographic stage, which can comprise a bowl shaped outer portion; one or more lights configured to cast light onto the photographic stage; and a light diffuser positioned in between the photographic stage and the one or more lights.

Many embodiments can include a method. The method can comprise placing an item in a photographic stage, which can comprise a bowl shaped outer portion; activating one or more lights configured to case light onto the photographic stage; and placing a light diffuser in between the photographic stage and the one or more lights.

A photographic system includes a concave circular bowl-shaped photographic stage that holds an object to be photographed. The system further includes a light diffusing screen that casts omni-directional light on the circular concave or bowl-shaped photographic stage, the light diffusing screen suspended above the concave circular bowl-shaped photographic stage. One or more lamps positioned above the light diffusing screen supply the light to be diffused. The system further includes an array of cameras positioned about a perimeter of the concave circular bowl-shaped photographic stage, as well as a computer based controller that individually fires the cameras that form the array. The computer based controller obtains and stores a photographic image as each of the cameras in the array takes an image of the object.

A method of using the photographic system as described includes setting up a number of cameras in the camera array based on the required resolution of a rotational view to be obtained, and positioning the object to be photographed in the center of the concave circular bowl-shaped photographic stage, taking the photographs, and supplying the photographs to a software package to form the rotational image.

BRIEF DESCRIPTION OF THE DRAWINGS

The present invention is further detailed with respect to the following drawings that are intended to show certain aspects of the present invention, but should not be construed as a limit on the practice of the present invention.

DETAILED DESCRIPTION OF THE INVENTION

Figure 1A:
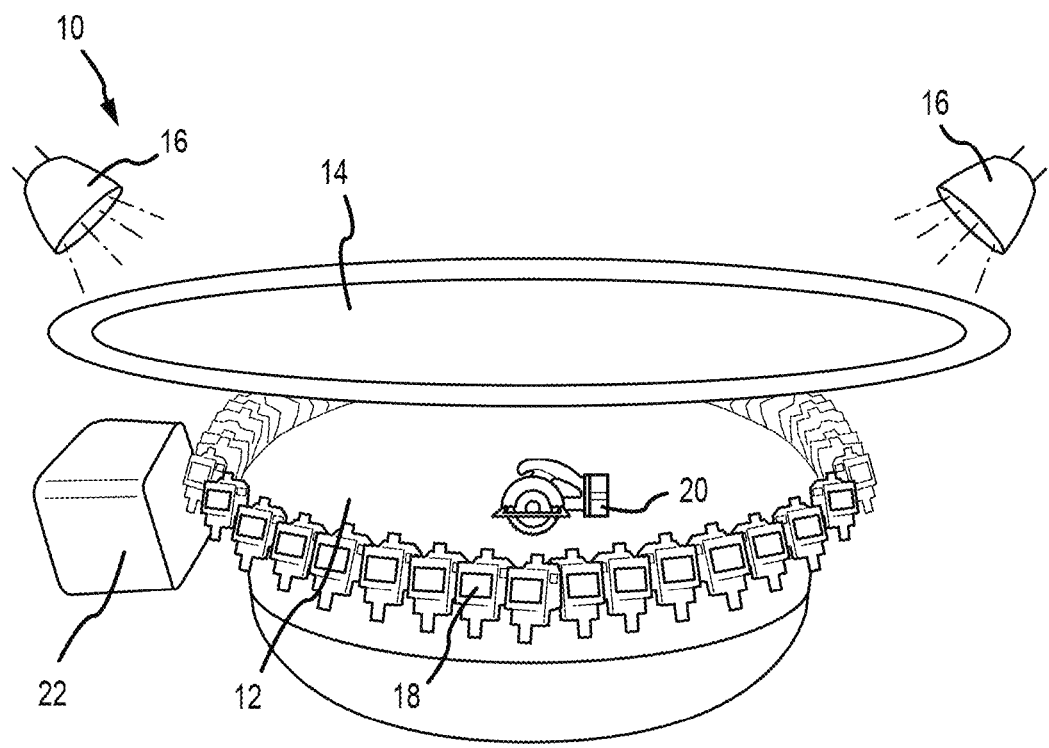
FIG. 1A is photographic view of a photographic system with an upper light diffuser and a bowl-shaped concave photographic stage surrounded by a camera array in accordance with an embodiment of the invention.

The present invention has utility as a concave circular bowl-shaped photographic stage and photographic system that provides consistent diffused lighting of an object or subject that is virtually shadow free for obtaining rotational views of the object or subject in a time efficient manner. The following description of various embodiments of the invention is not intended to limit the invention to these specific embodiments, but rather to enable any person skilled in the art to make and use this invention through exemplary aspects thereof.

It is to be understood that in instances where a range of values are provided that the range is intended to encompass not only the end point values of the range but also intermediate values of the range as explicitly being included within the range and varying by the last significant figure of the range. By way of example, a recited range from 1 to 4 is intended to include 1-2, 1-3, 2-4, 3-4, and 1-4.

As used herein, the term bowl shaped is intend to include a spherical dome, a hemispherical dome, and as well an elliptical dome formed by a plane intersecting an ovoid.

Embodiments of the inventive photographic system provide for a series of photographs to be taken of an object or subject that allows a user to rotate objects or subjects up to 360 degrees on a display screen to gain a three-dimensional perspective of the target. It is appreciated the word target as used herein refers to both physical objects as well as living subjects such as fashion models or animals. In specific inventive embodiments, the series of photographs may be used to for photogrammetry that builds three-dimensional objects from a series of photographic angles. In order to produce images of an actual object or subject to be rotated with a rotational software package, multiple still pictures or frames of the object or subject must be taken or generated from various angles, or the target must be repositioned multiple times in front of an image capture device or camera. Furthermore, proper illumination of the object or subject to be photographed must be maintained at all angles. The object or subject to be photographed should be uniformly lit from all directions without glare and with minimal shadowing.

The uniform lighting and minimal shadowing is obtained in embodiments of the invention with an inventive circular concave or bowl-shaped photographic stage that is uniformly lit from above by a diffusing screen. The concave shape of the photographic bowl provides omni-directional lighting to the object to be photographed, thereby evenly illuminating the object placed in the center of the bowl-shaped stage. The surface of the bowl is made of a light reflecting material that bounces the diffused light from the diffusing screen toward the object to be photographed. The light reflecting material may be a light scattering sheet material such as a white canvas or gray walls, or a hard surface painted with a reflective paint. It is appreciated that in addition to diffused lighting, direct lighting may also be used in specific inventive embodiments as a direct accent light depending on the product being photographed. A further advantage provided by embodiments of the inventive photographic bowl in addition to even lighting is the creation of a white background at all angles without the need to mask the product or use of a green screen. It should be noted that existing systems use heavy backlight and Plexiglas turntables, and while this works fine for some products it becomes very problematic for certain products. The endless white background provided by embodiments of the inventive photographic bowl does not depend on supplemental lighting. Embodiments of the inventive circular concave or bowl-shaped photographic stage may be a stationary stage that is surrounded by a camera array to obtain the multiple photographic perspective shots to form a rotatable image of an object, or a single camera may be moved about the outer perimeter of the photographic stage to obtain the series of photographs to form the rotatable image. Alternatively, the circular concave or bowl-shaped photographic stage may rotate with a single camera in a fixed position camera taking pictures of the object as the object rotates with the stage. In a specific inventive embodiment, the entire bowl-shaped photographic stage may be tilted in relationship to the cameras so that the playback of the obtained series of photographs provides an image with an elliptical orbit. An advantage of tilting the bowl-shaped photographic stage is that it is much quicker then positioning a camera array in an elliptical path and the stage can be varied between shots.

A further advantage provided by embodiments of the inventive circular concave or bowl-shaped photographic stage is the ability to walk around and see all angles of an object or subject to be photographed prior to photographing the 360 degree image. It is very simple to adjust the lighting for optimal photography without worrying about glare or flare as would be the case when rotating a reflective product.

In a specific inventive embodiment, an extending center column positioned at the base of the circular concave or bowl-shaped photographic stage may be used to keep the center of mass of an object in the center of the frame no matter the size of the object to be photographed. Thus for example, a hand held tool or a large household appliance may be positioned and photographed using an embodiment of bowl-shaped photographic stage.

Referring now to the figures, FIG. 1A is photographic view of a photographic system 10 with an upper light diffuser 14 and a circular concave or bowl-shaped photographic stage 12 surrounded by a camera array 18. The upper light diffuser 14 is lit by one or more lamps 16 that cast omni-directional light on the circular concave or bowl-shaped photographic stage 12. The perimeter of the photographic stage 12 is surrounded by a camera array 18. The camera array 18 is controlled by a computer 22 that individually fires the cameras that form the array 18, and obtains and stores the photographic images as each of the cameras 18n take an image of the object 20 placed in the center of the circular concave or bowl-shaped photographic stage 12.

Figure 1B:
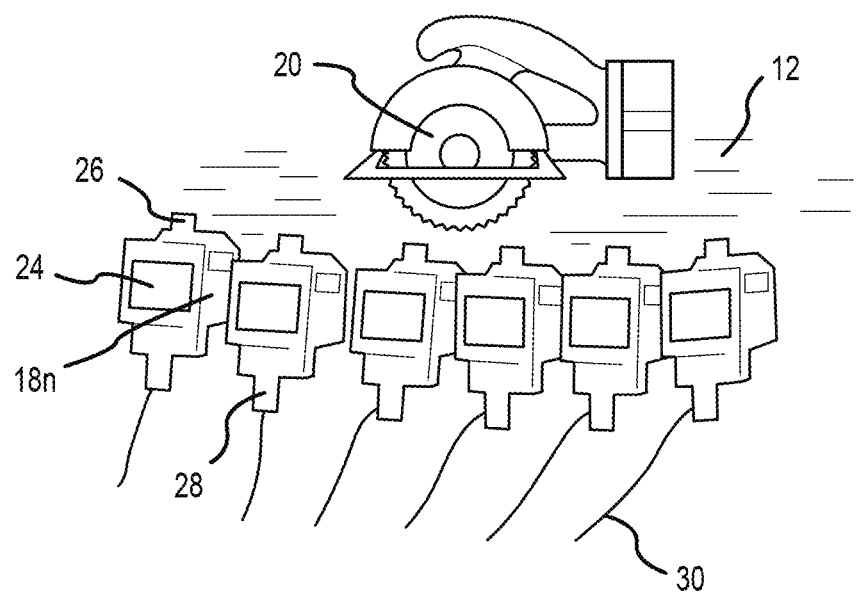
FIG. 1B is a detailed close-up view of FIG. 1A showing the camera array and the bowl-shaped photographic stage surrounded by the camera array in accordance with an embodiment of the invention.

FIG. 1B is a detailed close-up view of FIG. 1A showing the camera array 18 and the bowl-shaped photographic stage 12 surrounded by the camera array 18. As shown, each camera 18n that forms the camera array 18 may have an information and field of view screen 24 that may be used to set up, align, and focus each camera 18n. Each camera 18n may have a flash 26 which may be triggered when a photograph is taken by that camera in the array. Each of the cameras 18n may have a data and control cable 30 that tethers each camera 18n to the computer controller 22. It is appreciated that information may be sent and received from each camera wirelessly. Each camera 18n may have a mount 28 to fix the camera 18n in the array. As shown the object 20 being photographed is a circular saw.

Figure 2A:
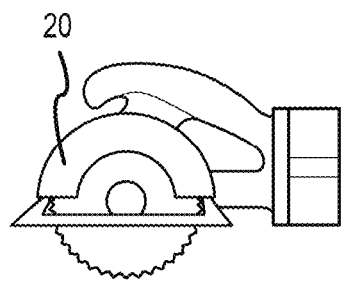
FIG. 2A is a series of photographs (a-p) of the rotation of a circular saw, the photographs taken with the system of FIG. 1A in accordance with embodiments of the invention.
Figure 2A:
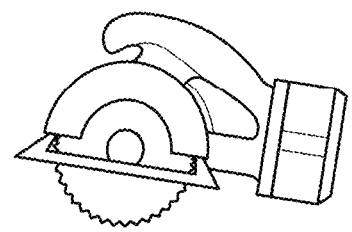
Figure 2A:
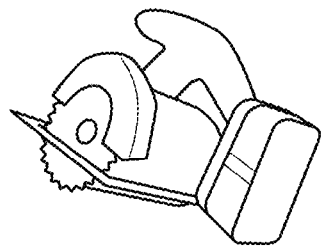
Figure 2A:
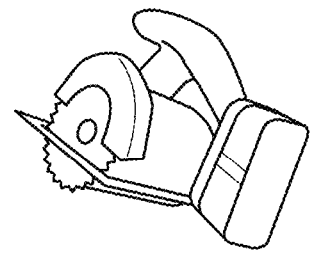
Figure 2A:
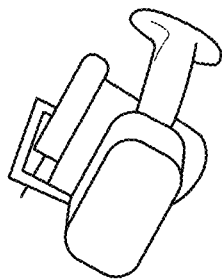
Figure 2A:
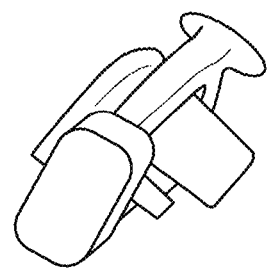
Figure 2A:
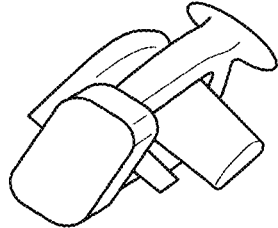
Figure 2A:
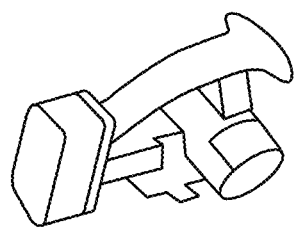
Figure 2A:
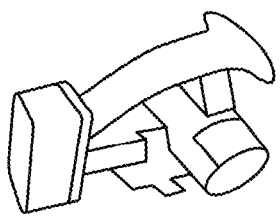
Figure 2A:
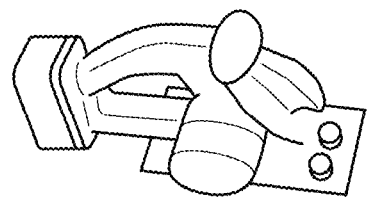
Figure 2A:
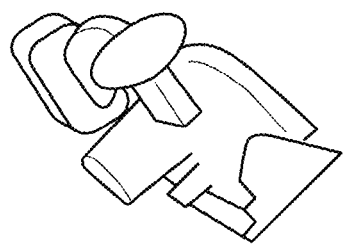
Figure 2A:
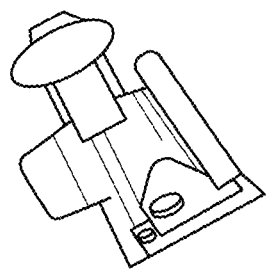
Figure 2A:
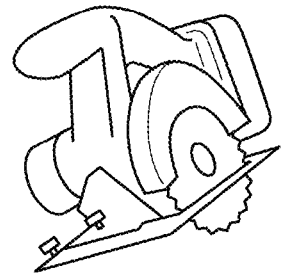
Figure 2A:
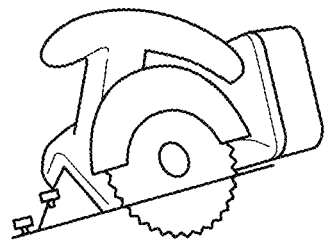
Figure 2A:
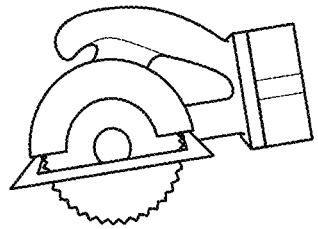
Figure 2A:
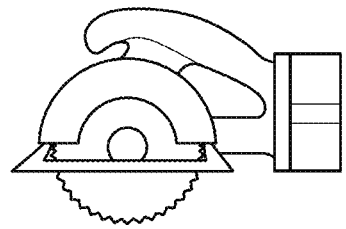

FIG. 2A is a series of photographs (a-p) of the rotation of a circular saw, the photographs taken with the system of FIG. 1A. It should be appreciated that the resolution shown in FIG. 2A of the rotation of the object 20 is low for illustrative purposes and corresponds to just 15 camera (18*n*) angles. However, if images from all 60 cameras 18*n* shown in FIG. 1A are used, a nearly seamless rotation of the object 20 would be observed by a user with rotational software on a display screen. As clearly shown, the individual images (a-p) are evenly light with virtually no shadowing that would obscure image details.

Figure 2B:
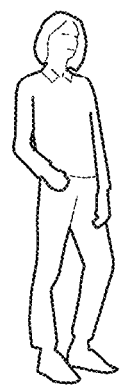
FIG. 2B is a series of photographs (a-f) of rotational views of a live model taken with the system of FIG. 1A in accordance with embodiments of the invention.
Figure 2B:
Figure 2B:
Figure 2B:
Figure 2B:
Figure 2B:
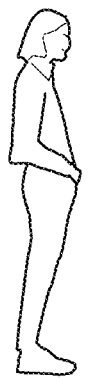

FIG. 2B is a series of photographs (a-f) of rotation views of a live model, the photographs taken with the system of FIG. 1A. It should be appreciated that the resolution shown in FIG. 2B of the rotation of the live model is low for illustrative purposes and corresponds to just six camera (18*n*) angles. However, if images from all 60 cameras 18*n* shown in FIG. 1A are used, a nearly seamless rotation of the live model would be observed by a user with rotational software on a display screen. As clearly shown, the individual images (a-f) are evenly light with virtually no shadowing that would obscure image details.

Figure 3:
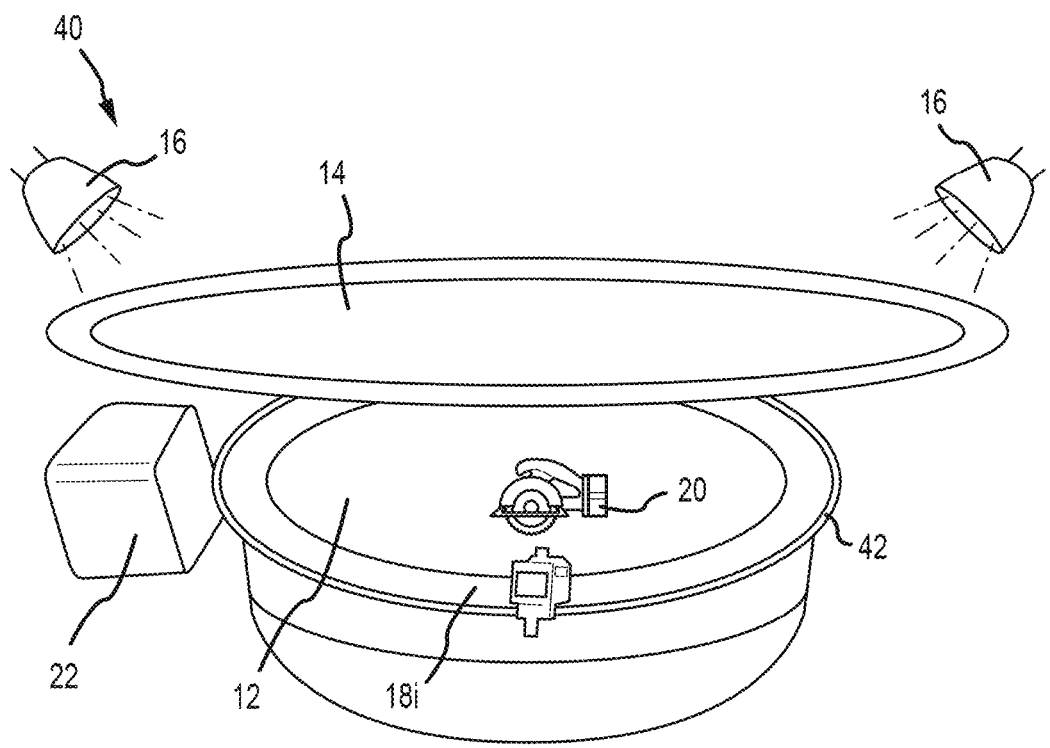
FIG. 3 is a photographic view of a photographic system with an upper light diffuser and a bowl-shaped concave photographic stage with a single movable track mounted camera in accordance with an embodiment of the invention.

FIG. 3 is a photographic view of a photographic system 40 with an upper light diffuser 14 and a bowl-shaped concave photographic stage 12 with a single movable track mounted camera 18*i*. The camera 18 is moved along the track 42 in order to gain the different perspective angles of the object 20 for forming a series of photographs that form the rotational view of the object 20. The camera may be mounted to a motor (not shown) for travel along the circumferential track 42. The travel motor may be automatically controlled by the computer controller 22 to position the camera 18*i* in each position along the track 42, where the number of stopping points is defined by the required resolution of the rotational view to be formed from the series of images taken by the camera 18*i*. The camera 18*i* may have a wired or wireless connection to the computer controller 22.

Figure 4:
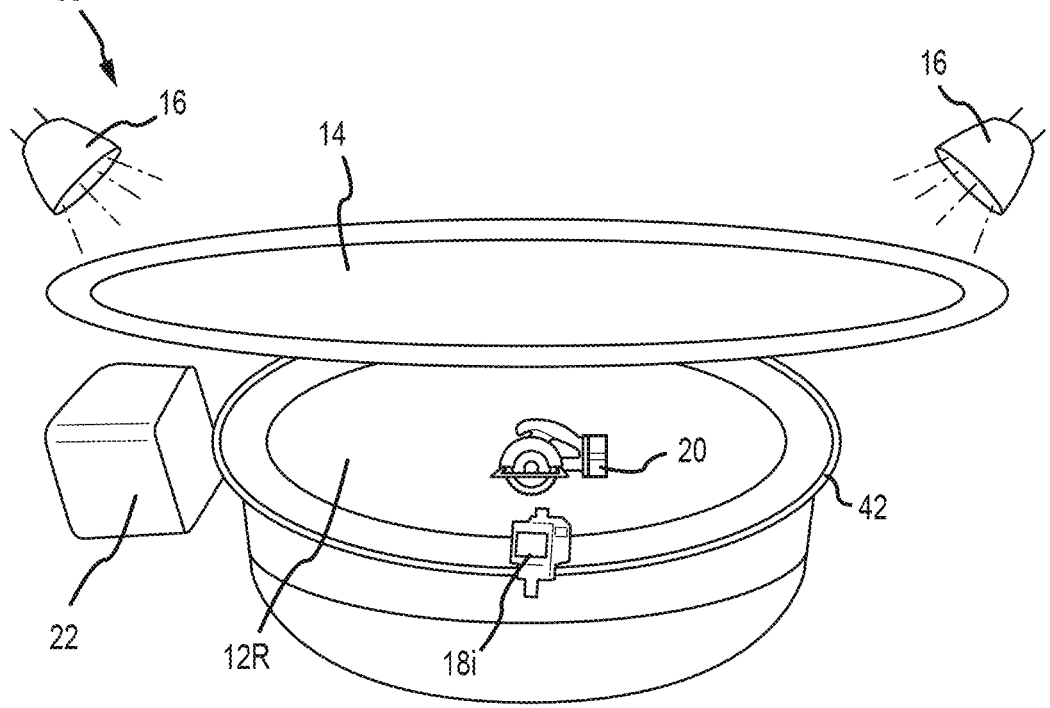
FIG. 4 is a photographic view of a photographic system with an upper light diffuser and a rotating bowl-shaped concave photographic stage with a single stationary camera in accordance with an embodiment of the invention.

FIG. 4 is a photographic view of a photographic system 50 with an upper light diffuser 14 and a rotating bowl-shaped concave photographic stage 12R with a single stationary track mounted camera 18*i*. The bowl-shaped concave photographic stage 12R is rotated about its center axis, with the object 20 to be photographed resting in the center at the center axis of the stage 12R. The rotation of the stage 12R and of the object 20 allows the single fixed camera 18*i* to gain the different perspective angles of the object 20 for forming a series of photographs that form the rotational view of the object 20. The rotating bowl-shaped concave photographic stage 12R may be mounted to a motor (not shown) for rotational movement. The motor may be automatically controlled by the computer controller 22 to rotate the stage 12R in different incremental positions in relation to the fixed camera 18*i*, where the number of stopping points is defined by the required resolution of the rotational view to be formed form the series of images taken by the camera 1 8*i*. The camera 18*i* may have a wired or wireless connection to the computer controller 22.

Figure 5A:
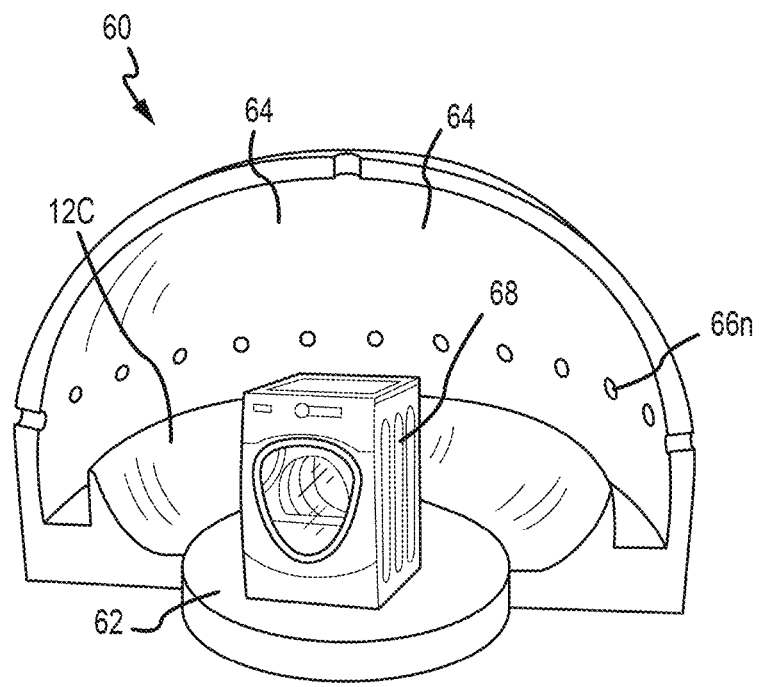
FIGS. 5A and 5B are partial cutaway views of a photographic system with a bowl-shaped concave photographic stage with an extending center column positioned at the base of the circular concave or bowl-shaped photographic stage surrounded by a dome with a camera array in accordance with an embodiment of the invention.
Figure 5B:
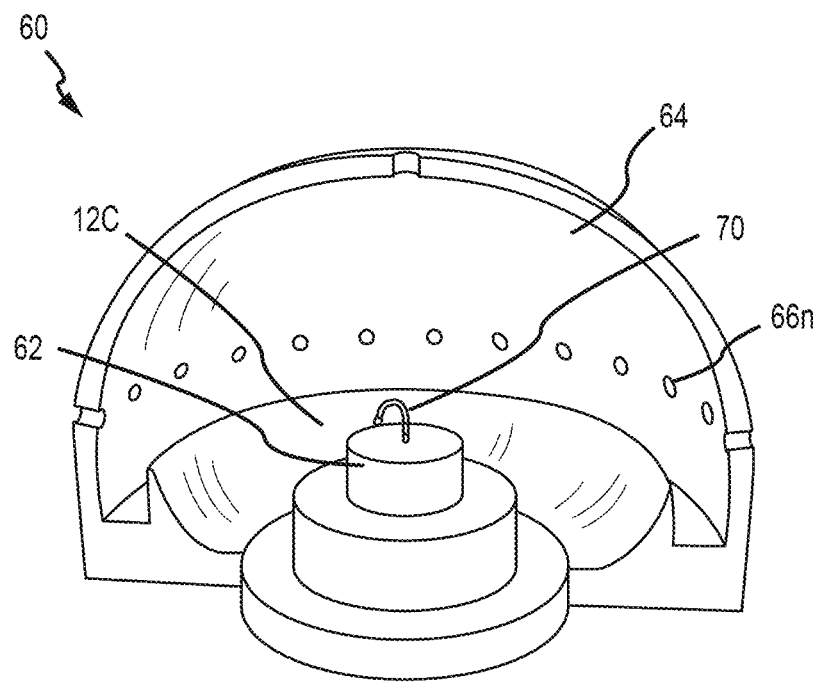

FIGS. 5A and 5B are partial cutaway views of a photographic system 60 with a bowl-shaped concave photographic stage 12C with an extending center column 62 positioned at the base of the circular concave or bowl-shaped photographic stage 12C surrounded by a dome 64 with a camera array 18*n* positioned behind apertures 66*n*. The apertures 66*n* may have shutters that are closed when each of the cameras 18*n* are not in use. The extending center column 62 positioned at the base of the circular concave or bowl-shaped photographic stage 12C may be used to keep the center of mass of an object in the center of the frame no matter the size of the object to be photographed. In FIG. 5A a large appliance such as a washer 68 is centered on an un-extended center column 62. In FIG. 5B a small object such as a faucet 70 is shown on an extended center column 62 in order to keep the faucet in the center of the photographic stage 12C. The dome 64 may be lined with a light reflecting material that bounces light from the diffusing screen toward the object to be photographed. The light reflecting material may be a light scattering sheet material such as a white canvas or gray walls, or a hard surface painted with a reflective paint.

Figure 6:
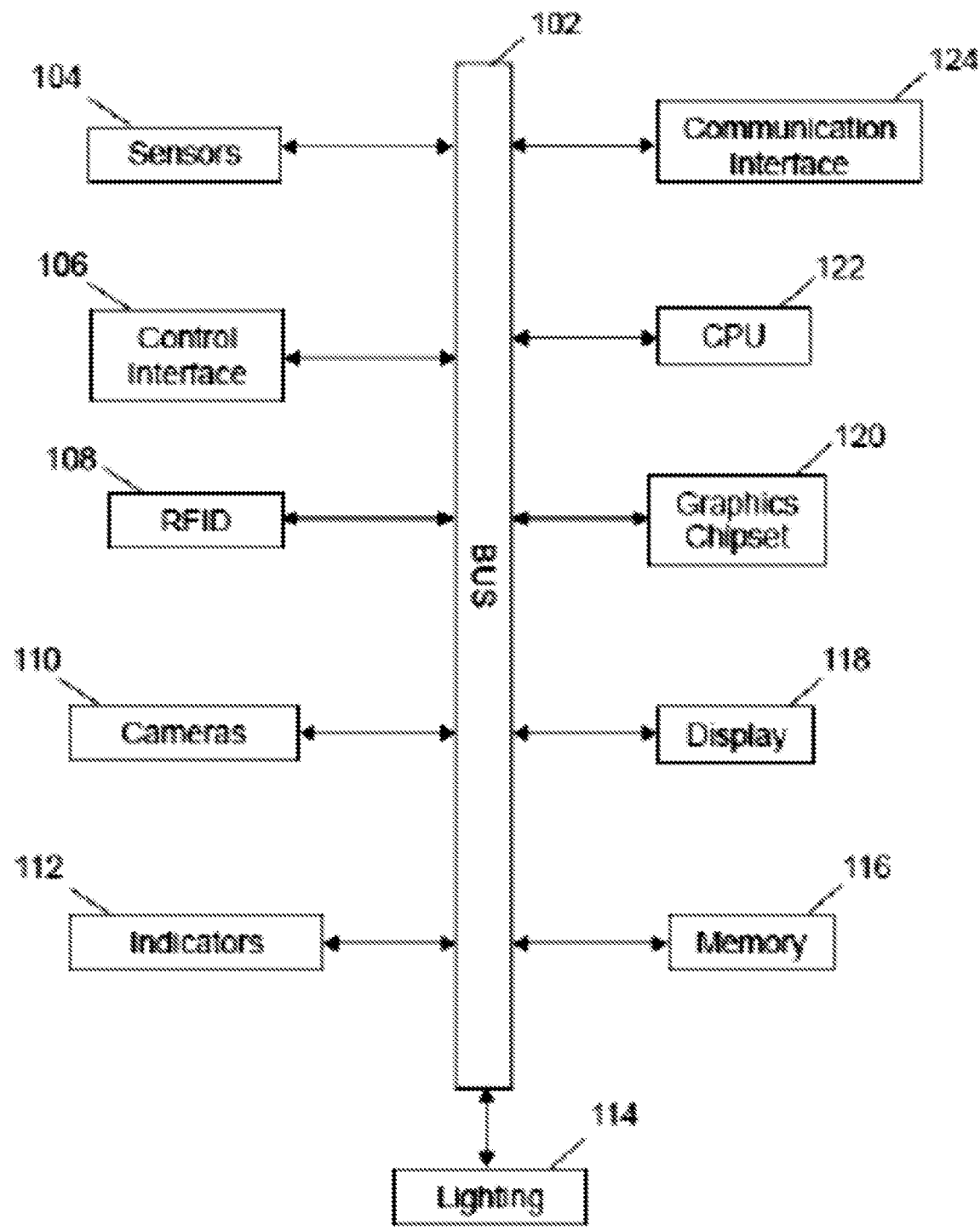
FIG. 6 is a system block diagram of the major components of the system of FIGS. 1A, 3, and 4.

FIG. 6 is a system block diagram 100 of the major components of a photographic system for photographing objects with a bowl-shaped photographic stage. As used herein, the term "bowl-shaped" refers to a spherical dome with an interior volume, a spherical cap representing a sphere intersected and cutoff by a plane. When the plane intersects the diameter of the spherical dome, this is termed a hemispheric dome. A central process unit (CPU) 122 in the controller 22 coordinates and controls the overall operation of the photographing system 100 that may be operated in the photographic stages disclosed above. The communication interface 124 is representative of various links and input connections and devices illustratively including but not limited to wired and wireless links, optical drives, universal serial bus (USB), flash memory slot, and combinations thereof, for receiving and sending data that may or may not be in real time. The bus 102 links the various components in the system. Memory 116 serves as storage for operating programs and firmware for the photographic system 100. A database with object and client information is stored in Memory 116. Memory 116 is made up of ROM and random access memory (RAM). Graphics chipset 120 drives a display 118. The display 118 may be liquid crystal display (LCD), light emitting diode (LED), or other known display technologies. Control interface 106 may include knobs, buttons, and other touch sensitive controls for selecting various menu items or for inputting alphanumeric information. Sensors 104 sense the presence of an object and object position. RFID 108 is a reader that detects and interrogates tags that may be mounted to the object to be photographed. Cameras 110 and lighting 114 are controlled and sequenced by the CPU 122. Indicators 112 provide visual feedback to system users.

Other Embodiments

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:

1. A system comprising:
   a photographic stage comprising:
      a bowl shaped outer portion; and
      an item placement portion comprising a height adjustable column, wherein a top surface of the height adjustable column is flush with a floor of the photographic stage when the height adjustable column is in an un-extended state;
   one or more lights configured to cast light onto the photographic stage; and a light diffuser positioned in between the photographic stage and the one or more lights.

2. The system of claim 1, wherein the light diffuser is positioned above the photographic stage.

3. The system of claim 2, wherein the one or more lights are positioned above the light diffuser.

4. The system of claim 3, wherein a gap is between the photographic stage and the light diffuser.

5. The system of claim 1, wherein the bowl shaped outer portion of the photographic stage rotates around a central axis.

6. The system of claim 1, wherein the photographic stage is tilted relative to one or more cameras surrounding the photographic stage.

7. The system of claim 1 further comprising:
a computer system configured to activate the one or more lights.

8. The system of claim 1, wherein the bowl shaped outer portion has an ovoid cross section.

9. The system of claim 1, wherein the light diffuser further comprises an aperture that opens when at least one of the one or more lights is activated.

10. A method comprising:
placing an item in an item placement portion of a photographic stage comprising a bowl shaped outer portion, the item placement portion comprising a height adjustable column having a top surface that is flush with a floor of the photographic stage when the height adjustable column is in an un-extended state;
activating one or more lights configured to cast light onto the photographic stage; and
placing a light diffuser in between the photographic stage and the one or more lights.

11. The method of claim 10, wherein the placing the light diffuser comprises placing the light diffuser (1) above the photographic stage and (2) in between the photographic stage and the one or more lights.

12. The method of claim 11, wherein the activating the one or more lights comprises activating the one or more lights when the one or more lights are above the light diffuser, wherein the one or more lights are configured to cast the light onto the photographic stage.

13. The method of claim 12, wherein a gap is between the photographic stage and the light diffuser.

14. The method of claim 10, wherein the bowl shaped outer portion of the photographic stage rotates around a central axis.

15. The method of claim 10 further comprising tilting the photographic stage relative to one or more cameras surrounding the photographic stage.

16. The method of claim 10, wherein the activating the one or more lights comprises using a computer system to activate the one or more lights.

17. The method of claim 10, wherein the bowl shaped outer portion has an ovoid cross section.

18. The method of claim 10 further comprising opening an aperture in the light diffuser when at least one of the one or more lights is activated.

19. The system of claim 6, wherein the one or more cameras travel along an elliptical path around the tilted item placement portion in response to initiation of a photo capture sequence.

20. The method of claim 15 further comprising causing the one or more cameras to travel along an elliptical path around the tilted item placement portion.

* * * * *